United States Patent
Blubaugh et al.

(10) Patent No.: US 8,298,439 B2
(45) Date of Patent: Oct. 30, 2012

(54) CHEMICAL BINDER FOR COATING PAYLOAD IN OPEN TOP HOPPER CARS, TRUCKS, PILES, AND SIMILAR STORAGE/SHIPPING CONTAINERS

(75) Inventors: Stephen J. Blubaugh, Naperville, IL (US); Kevin L. O'Brien, Saint Charles, IL (US)

(73) Assignee: Nalco Company, Naperville, IL (US)

( * ) Notice: Subject to any disclaimer, the term of this patent is extended or adjusted under 35 U.S.C. 154(b) by 106 days.

(21) Appl. No.: 13/075,702

(22) Filed: Mar. 30, 2011

(65) Prior Publication Data

US 2012/0248369 A1   Oct. 4, 2012

(51) Int. Cl.
   *C09K 3/22* (2006.01)
(52) U.S. Cl. ...................................... 252/88.1; 252/88.2
(58) Field of Classification Search .................. None
   See application file for complete search history.

(56) References Cited

U.S. PATENT DOCUMENTS

| | | | |
|---|---|---|---|
| 5,089,540 A | 2/1992 | Armbruster et al. | |
| 5,181,957 A | 1/1993 | Gross et al. | |
| 5,244,473 A | 9/1993 | Sardessai et al. | |
| 5,441,566 A * | 8/1995 | Vaughan | 118/300 |
| 5,487,764 A | 1/1996 | Ford, Jr. | |
| 5,622,561 A | 4/1997 | Cummins et al. | |
| 5,648,116 A | 7/1997 | Roe et al. | |
| 5,747,104 A | 5/1998 | Baebel et al. | |
| 2009/0025276 A1 | 1/2009 | Tran | |
| 2009/0189113 A1 | 7/2009 | Lamperd et al. | |

FOREIGN PATENT DOCUMENTS

| | | |
|---|---|---|
| WO | 02/12574 A1 | 2/2002 |
| WO | 2009/023652 A1 | 2/2009 |
| WO | 2010/110805 A1 | 9/2010 |

* cited by examiner

*Primary Examiner* — Necholus Ogden, Jr.
(74) *Attorney, Agent, or Firm* — Benjamin E. Carlsen; Andrew D. Sorenson

(57) ABSTRACT

The invention is directed towards methods and compositions for treating piles of particulate materials to inhibit and prevent the loss of valuable fuel or mineral dust from being released from storage piles or open containers. The method involves applying to the pile a binder coating containing VAE and crude glycerin. The binder coating cures and hardens slowly so it is able to remain flexible while the pile or payload is still settling, jostling, being bumped, and otherwise moving around. This coating is especially effective for coal piles and also for piles within and for being moved by open topped railroad cars. The coating's flexibility prevents the coating from becoming brittle and shattering. The coating has better performance than its ingredients do alone. The coating is effective both when it is flexible and after it cures. As a result the invention can both prevent unwanted dust pollution as well as save its users money by avoiding loss of blown away material.

11 Claims, No Drawings

CHEMICAL BINDER FOR COATING PAYLOAD IN OPEN TOP HOPPER CARS, TRUCKS, PILES, AND SIMILAR STORAGE/SHIPPING CONTAINERS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

This invention relates to methods and compositions for containing particulate matter within open top receptacles including but not limited to open top hopper cars, trucks, piles, and similar storage and/or shipping containers. Treating a load of particulate material (and in particular coal) with a binding agent (sometimes referred to as a crusting agent) to encrust a surface and thereby retain valuable material as well as prevent the spreading of dust from the particulate is known. Prior binding agents are described among other places in U.S. Pat. No. 5,441,566. These binding agents include latexes, petroleum products, and pine tar resins. Other binding agents include phenolaldehyde resin mixed with a polyisocyanate in the presence of a catalyst (described in U.S. Pat. No. 5,244,473), alkaline phenolic resin (described in U.S. Pat. No. 5,089,540), and styrene in a hygroscopic solvent (methyl ethyl ketone), polyvinyl acetate and water (described U.S. Pat. No. 5,487,764). Additional dust suppressants are described in U.S. Pat. Nos. 5,181,957 and 5,747,104, 5,648,116, US Published Patent Application 2009/0189113 A1, and Published PCT Applications 02/12574 A1, 2010/110805 A1 and 2009/023652 A1.

Unfortunately many of these binders cause the particulate material to retain large amounts of water which can lead to diminished value and effectiveness. In the context of coal, increased water content results in decreased. BTU content and increased likelihood of spontaneous combustion from water induced oxidation of the coal. Furthermore the binders tend to form brittle coatings which tend to shatter and dissipate as the particulate material settles and shifts due to the effects of transit and storage. Problems due to the brittleness of the binder coatings become exacerbated when the material is stored in environments where the temperature fluctuates above and below freezing. This is because freezing and melting moisture further shifts the materials further shattering the binder coating.

Prior art binding materials also have a number of winter handling problems that can render application difficult and potentially ineffective. This is because such products often have a freezing point near that of water and once frozen, they no longer work. Even worse these prior art binder coatings after being frozen are not recoverable even after they have thawed or melted if they have been frozen. This greatly limits the conditions in which they can be used and applied.

Thus it is clear that there is clear utility in novel methods and compositions for binding the top of particulate materials stored or shipped in open top containers. The art described in this section is not intended to constitute an admission that any patent, publication or other information referred to herein is "Prior Art" with respect to this invention, unless specifically designated as such. In addition, this section should not be construed to mean that a search has been made or that no other pertinent information as defined in 37 CFR §1.56(a) exists.

BRIEF SUMMARY OF THE INVENTION

At least one embodiment of the invention is directed towards a method of inhibiting the release of dust from a pile of particulate material. The method comprises the step of applying to the exposed surface of the pile a binder composition. The binder composition comprises VAE and crude glycerin in a ratio of between 90:10 and 10:90.

The composition may further comprise water but the composition does not pass significant amounts of water to the pile. The cure rate of the composition may be slowed to allow settling of the pile. The pile may be within an open topped container. The pile may be within an open topped railroad car which is moving at least a part of the time. The particulate material may be coal.

DETAILED DESCRIPTION OF THE INVENTION

The following definitions are provided to determine how terms used in this application, and in particular how the claims, are to be construed. The organization of the definitions is for convenience only and is not intended to limit any of the definitions to any particular category.

"Crude glycerin" means a by-product derivative from a transesterification reaction involving triglycerides including transesterification reactions involving biodiesel manufacturing processes, in which the by-product comprises glycerin and at least one component selected from the list consisting of: fatty acids, esters, salt, methanol, tocopherol, sterol, mono-glycerides, di-glycerides, and tri-glycerides.

"Particulate material" means" a material that has a tendency to form dust particles when handled, processed, or contacted, which includes but is not limited to coal, dirt, wood chips, agricultural products, fruits, fertilizers, ores, mineral ores, fine materials, sand, gravel, soil, fertilizers, or other dust generating material, and any combination thereof.

"PVA" means polyvinyl acetate polymer.

"Mong" means non glycerol organic material and typically consists of soaps, free fatty acids, and other impurities.

"VAE" means vinyl acetate ethylene co-polymer. In at least one embodiment the repeating units of VAE are selected from one of formula I, II, III, IV, and any combination thereof wherein:

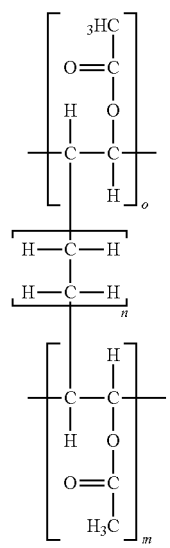

Formula (I)

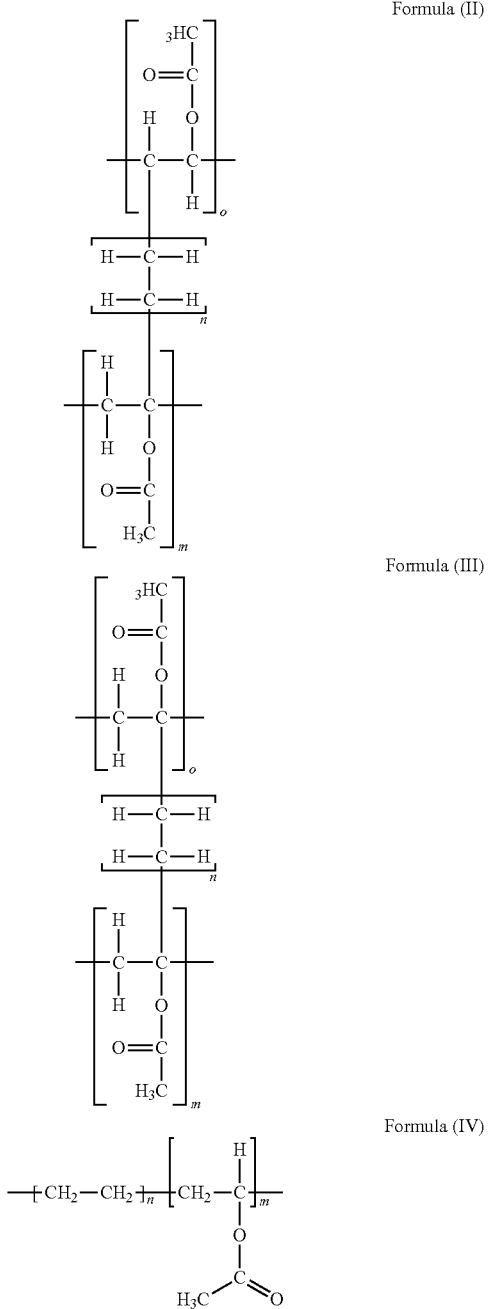

wherein n is the number of cross linking units, m is the number of first chain units, and o is the number of second chain units, either, some, or all of n, m, and o can be 1 or more, although m and o will frequently be 2 or 3 or 4 or more, either or both of the first and second chain units can be left side end (terminal) units of a polymer chain and/or right side end (terminal) units of a polymer chain. VAE can also comprise co-polymers containing additional cross linking units and can comprise additional polymer chains.

In the event that the above definitions or a description stated elsewhere in this application is inconsistent with a meaning (explicit or implicit) which is commonly used, in a dictionary, or stated in a source incorporated by reference into this application, the application and the claim terms in particular are understood to be construed according to the definition or description in this application, and not according to the common definition, dictionary definition, or the definition that was incorporated by reference. In light of the above, in the event that a term can only be understood if it is construed by a dictionary, if the term is defined by the *Kirk-Othmer Encyclopedia of Chemical Technology*, 5th Edition, (2005), (Published by Wiley, John & Sons, Inc.) this definition shall control how the term is to be defined in the claims.

In at least one embodiment the surface of a pile of particulate matter is treated with a binder to prevent the loss of material and the release of dust from the pile. The binder is a composition comprising a VAE copolymer and crude glycerin The crude glycerin is derived from a transesterification reaction involving triglycerides.

Biodiesel is typically made through a chemical process called transesterification in which vegetable oil or animal fats are converted to fatty acid alkyl esters and crude glycerin by-product. Fatty acids and fatty acid alkyl esters can be produced from oils and fats by base-catalyzed transesterification of the oil, direct acid-catalyzed esterification of the oil and conversion of the oil to fatty acids and subsequent esterification to biodiesel.

The majority of fatty acid alkyl esters are produced by the base-catalyzed method. In general, any base may be used as the catalyst used for transesterification of the oil to produce biodiesel, however sodium hydroxide or potassium hydroxide are used in most commercial processes.

Suitable examples of crude glycerin and its manufacture can be found in among other places in U.S. patent application Ser. No. 12/246,975. In the biodiesel manufacturing process, the oils and fats can be filtered and preprocessed to remove water and contaminants. If free fatty acids are present, they can be removed or transformed into biodiesel using special pretreatment technologies, such as acid catalyzed esterification. The pretreated oils and fats can then be mixed with an alcohol and a catalyst (e.g. base). The base used for the reaction is typically sodium hydroxide or potassium hydroxide, being dissolved in the alcohol used (typically ethanol or methanol) to form the corresponding alkoxide, with standard agitation or mixing. It should be appreciated that any suitable base can be used. The alkoxide may then be charged into a closed reaction vessel and the oils and fats are added. The system can then be closed, and held at about 71 degrees C. (160 degrees F.) for a period of about 1 to 8 hours, although some systems recommend that the reactions take place at room temperature.

Once the reactions are complete the oil molecules (e.g. triglycerides) are hydrolyzed and two major products are produced: 1) a crude fatty acid alkyl esters phase (i.e. biodiesel phase) and 2) a crude glycerin phase. Typically, the crude fatty acid alkyl ester phase forms a layer on top of the denser crude glycerin phase. Because the crude glycerin phase is denser than the biodiesel phase, the two can be gravity separated. For example, the crude glycerin phase can be simply drawn off the bottom of a settling vessel. In some cases, a centrifuge may be employed to speed the separation of the two phases.

The crude glycerin phase typically consists of a mixture of glycerin, methyl esters, methanol, mong and inorganic salts and water. Methyl esters are typically present in an amount of about 0.01 to about 5 percent by weight.

In at least one embodiment, methanol can be present in the crude glycerin in an amount greater than about 5 weight percent to about 30 weight percent. In at least one embodiment, the crude glycerin comprises about 30 to about 95 weight percent of glycerin.

VAE is a copolymer in which multiple vinyl acetate polymers contain ethylene side branches which form cross linkages and connect the polymers to each other forming copolymer networks.

In at least one embodiment the binder composition comprises between 90:10 and 10:90 of VAE copolymer to crude glycerin by mass. In at least one embodiment the composition further comprises water. In at least one embodiment the composition comprises water and the crude glycerin both prevents the freezing of the water and prevents its evaporation thereby increasing the lifespan and flexibility of the resulting coating. In at least one embodiment the binder coating contains water but does not transfer water to the coal bound by it.

In at least one embodiment the composition is applied according to any one of the methods or apparatuses of U.S. Pat. No. 5,441,566. In at least one embodiment the binder is applied to a pile within an open top container and forms a binder coating which prevents the substantial release of dust from the pile and the erosion of the pile by the release of such dust. In at least one embodiment the pile is within an open top railroad car and the binder coating prevents dust release and erosion while the car is travelling at railroad shipping speeds (for example >0 mph-250 mph).

The components of the coating composition may be mixed immediately before addition to the particulate material or may be pre-mixed or some components may be pre-mixed and other components may be mixed immediately before addition to the particulate material. The material may be applied in liquid form by a spray boom having one or more spray heads. In at least one embodiment the binder composition is applied to the material to be coated by at least one of the methods disclosed in U.S. Pat. No. 5,622,561.

In at least one embodiment the particulate material is drying slurry. Often in industrial applications a particulate material is or becomes heavily intermixed with water or another liquid and forms slurry. This slurry needs to have some or all of the liquid removed before a subsequent process can be performed on the material. While drying (whether by a dewatering technique or if left out to evaporate away the liquid by heat, sunlight, or the like) some or all of the slurry dries out and can generate dust emissions. The composition can be applied to a surface of the slurry to control dust emissions. The composition can be applied to the material when it is slurry, partially dry, completely dry, and any combination thereof. In at least one embodiment the slurry is Red Mud from a Bauxite mining and/or refining operation. In at least one embodiment the dust that is controlled comprises Sodium Carbonate particles. In at least one embodiment the composition is applied to slurry that is left to dry in a retaining pond or other sort of pond, basin, pool, or straining, drying, or filtering receptacle.

In at least one embodiment the composition is applied as the pile is being formed. When a particulate material is poured or dumped to form a pile, some of the material billows away from the pile in form of airborne dust. This can occur for example when material is loaded into a rail car, dump truck, storage facility, silo, or ship's hold. The composition can be applied to the material before and/or as it is poured or dumped into a pile. In at least one embodiment the material passes along a conveyer belt before it is poured or dumped and the composition is applied to the material as it travels along the belt. In at least one embodiment the composition functions as a tackifier which holds together the material in the form of larger clumps that are less likely to launch as airborne dust.

The inventive composition is quite effective and displays a number of unexpected and beneficial results. Prior art coating formulations such as PVA form a rigid glue shell or crust. This rigid glue shell contains particulate matter when intact, but suffers from a number of constraints. Prior art shells tend to be brittle and shatter when subjected to significant movement or displacement. With particulate material, particularly coal, and especially coal contained in a rapidly moving, jostling, and bumping railcar, the particulate material shifts as it settles into a more compact arrangement and this movement tends to shatter the brittle prior art shells. Railcars also tend to be impacted rather hard when being shunted in transfer stations which further increases the likelihood of shattering prior art binding coatings.

The unique chemistry of the composition however allows the binding coating of the invention to avoid shattering during settling and while moving at high speeds in a railroad car or when undergoing bumps or impacts. Without limitation to theory and in particular the scope of the claims, it is believed that the ethylene cross linkages between the polymer strands function as flexible hinges between the polymers. This allows the polymer strands to move, bend, and flex relative to each other more than prior art coatings allow, while at the same time providing an as good or better "glue" effect to the pile. The crude glycerin provides a synergistic effect which enhances the flexibility of the copolymer without impairing its structural strength.

In at least one embodiment, the cure rate (the amount of time needed before the glue like coating hardens) of the composition is an amount of time greater than it takes for the pile of particulate material to settle into a consistent arrangement. Thus when treated, the pile is always held in place, first by a more flexible coating and later by a harder cured coating. The composition has a longer cure rate than either VAE or other prior art binder coatings have by themselves.

In at least one embodiment the unique eutectic point of the crude glycerin enhances the performance of the composition. Crude glycerin is known to have a relatively high freezing point (similar to water) when it is nearly pure (more than 90%) or very dilute (less than 10%). However when it is cut with VAE, the freezing point of the blended material is reduced as is the freezing point of any water in solution with the blended material. As a result, when crude glycerin is combined with VAE in the above mentioned ratios (both with and without water), the overall composition is more resistant to freezing and therefore becomes far less brittle (and cures more slowly) than a composition containing a higher or lower ratio of crude glycerin or other prior art binding coatings would otherwise have. Moreover as previously stated, many coating formulations become ruined once they become frozen and will not form adequate coatings even after thawed out again. Because the composition is less prone to freezing, it can be applied under conditions in which prior art coatings would become frozen and are therefore unusable.

EXAMPLES

The foregoing may be better understood by reference to the following examples, which are presented for purposes of illustration and are not intended to limit the scope of the invention.

Tailings slurry from a minerals processing operation was used in a study to assess the inhibition of dust generation under various treatment regimes.

The treatments used included:
  Water—as used by many minerals processing operations to control dust formation in holding dams and/or tailings ponds.

Comparative example #1: A commercially available dust control product comprised of a styrene-acrylate copolymer.

Comparative example #2: A commercially available dust control product comprised of a concentrated glycerin solution in water.

Product A—a binder comprising a 50:50 mixture of VAE copolymer and crude glycerin.

A sample of tailings slurry was collected from a minerals processing facility and sub-samples were placed into plastic tubs (dimensions ~33×33×28 cm) which were lined with filter cloth and had a series of holes in the base to allow free drainage of any runoff liquid. Samples were stored in a greenhouse and allowed to dry for one week. Treatments as outlined in table 1 were then applied as 1% solutions to the surface of the dried tailings over a 10 week period. Each application used 500 ml of 1% solution applied evenly to the surface of the dried tailings using a pump sprayer. Tests were completed using duplicate samples for each treatment regime.

After the 10 weeks of drying and treatment the consolidated surface crust of each tailings sample was carefully removed and the underside brushed gently back into the tub to recover any dust present. A vacuum attachment which covered the bulk of the sample area was then gently pressed on the dried surface and the sample was vacuumed for 2 minutes. The collected dust (separate coarse and fine fractions from 2 filtration systems inbuilt in the vacuum cleaner) was weighed.

TABLE 1

| Product | Application regime | Total Dust Collected ($kg/m^2$) (Average of duplicate samples) |
|---|---|---|
| Water | Weekly | 1.11 |
| Water | Twice weekly | 0.88 |
| Comparative example #1 | Weekly | 0.19 |
| Comparative example #1 | Twice weekly | 0.11 |
| Comparative example #2 | Weekly | 0.92 |
| Comparative example #2 | Twice weekly | 1.10 |
| Product A | Weekly | 0.03 |
| Product A | Twice weekly | 0.02 |

After the 10 weeks of drying and treatment the consolidated surface crust of each tailings sample was carefully removed and the underside brushed gently back into the tub to recover any dust present. A vacuum attachment which covered the bulk of the sample area was then gently pressed on the dried surface and the sample was vacuumed for 2 minutes. The collected dust (separate coarse and fine fractions from 2 filtration systems inbuilt in the vacuum cleaner) was weighed.

The vacuum attachment also had 4 side inlets that were closed in the first dust collection. For a second collection air was fed air at 50 psi into the four inlets (generating a 'mini cyclone' environment) while the attachment was again pressed on the mud surface and the surfaces re-vacuumed for a further 2 min (Collection 2).

Total dust collected was recorded in $kg/m^2$ based on the weight of dust collected and the surface area of the vacuum attachment used to cover the surface where dust was collected.

The results in table 1 indicate the superior and surprising dust control properties of Product A when compared both to the two separate conventional, commercially available dust control treatments, as well as water as a dust control measure.

While this invention may be embodied in many different forms, there described in detail herein specific preferred embodiments of the invention. The present disclosure is an exemplification of the principles of the invention and is not intended to limit the invention to the particular embodiments illustrated. All patents, patent applications, scientific papers, and any other referenced materials mentioned herein are incorporated by reference in their entirety. Furthermore, the invention encompasses any possible combination of some or all of the various embodiments described herein and incorporated herein.

The above disclosure is intended to be illustrative and not exhaustive. This description will suggest many variations and alternatives to one of ordinary skill in this art. All these alternatives and variations are intended to be included within the scope of the claims where the term "comprising" means "including, but not limited to". Those familiar with the art may recognize other equivalents to the specific embodiments described herein which equivalents are also intended to be encompassed by the claims.

All ranges and parameters disclosed herein are understood to encompass any and all subranges subsumed therein, and every number between the endpoints. For example, a stated range of "1 to 10" should be considered to include any and all subranges between (and inclusive to of) the minimum value of 1 and the maximum value of 10; that is, all subranges beginning with a minimum value of 1 or more, (e.g. 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

This completes the description of the preferred and alternate embodiments of the invention. Those skilled in the art may recognize other equivalents to the specific embodiment described herein which equivalents are intended to be encompassed by the claims attached hereto.

What is claimed is:

1. A method of inhibiting the release of dust from a pile of particulate material, the method comprising the step of applying to the exposed surface of the pile a binder composition, the binder composition comprising VAE and crude glycerin in a ratio of between 90:10 and 10:90.

2. The method of claim 1 wherein the composition further comprises water but does not pass significant amounts of water to the pile.

3. The method of claim 1 wherein the cure rate of the composition is slowed to allow settling of the pile.

4. The method of claim 1 wherein the pile is within an open topped container.

5. The method of claim 1 wherein the pile is within an open topped railroad car and the railroad car moves at least a part of the time.

6. The method of claim 1 wherein the particulate material is coal.

7. The method of claim 1 wherein the particulate material is slurry.

8. The method of claim 1 wherein the particulate material is applied as the pile is being formed by a dumping process.

9. The method of claim 1 wherein the dust would result from sodium carbonate being released by the pile.

10. The method of claim 1 wherein the particulate material is Red Mud.

11. The method of claim 1 wherein the pile is within a ship's hold.

* * * * *